United States Patent
Gabrielli et al.

(10) Patent No.: US 8,050,390 B2
(45) Date of Patent: Nov. 1, 2011

(54) DEVICE AND A METHOD FOR FEEDING ELECTRIC DEVICES FROM A TELEPHONE LINE

(75) Inventors: Luciano Gabrielli, Turin (IT); Fulvio Taiariol, Turin (IT); Paolo Vailati, Turin (IT)

(73) Assignees: Telecom Italia S.p.A., Milan (IT); Pirelli & C. S. p. A., Milan (IT)

( * ) Notice: Subject to any disclaimer, the term of this patent is extended or adjusted under 35 U.S.C. 154(b) by 1339 days.

(21) Appl. No.: 11/578,038

(22) PCT Filed: Apr. 13, 2004

(86) PCT No.: PCT/EP2004/003878
§ 371 (c)(1),
(2), (4) Date: Oct. 12, 2006

(87) PCT Pub. No.: WO2005/101804
PCT Pub. Date: Oct. 27, 2005

(65) Prior Publication Data
US 2007/0258580 A1    Nov. 8, 2007

(51) Int. Cl.
*H04M 11/00*    (2006.01)
(52) U.S. Cl. .............. 379/90.01; 379/413; 379/324; 379/933.01
(58) Field of Classification Search .......... 379/90.01, 379/93.06, 93.07, 93.08, 93.28, 413, 324, 379/572
See application file for complete search history.

(56) References Cited

U.S. PATENT DOCUMENTS

| | | | |
|---|---|---|---|
| 4,295,008 A * | 10/1981 | Johnson et al. | 379/32.01 |
| 4,961,220 A | 10/1990 | Tentler et al. | |
| 5,222,125 A * | 6/1993 | Creswell et al. | 379/114.05 |
| 5,343,514 A * | 8/1994 | Snyder | 379/93.01 |
| 5,461,671 A | 10/1995 | Sakuragi et al. | |
| 5,553,138 A * | 9/1996 | Heald et al. | 379/413 |

(Continued)

FOREIGN PATENT DOCUMENTS

AT    409 909 B    12/2002

(Continued)

OTHER PUBLICATIONS

Morihiko Ito; "Receiver Charger for Radio Calling"; Patent Abstracts of Japan of JP-01248835, Oct. 4, 1989.

*Primary Examiner* — Melur Ramakrishnaiah
(74) *Attorney, Agent, or Firm* — Finnegan, Henderson, Farabow, Garrett & Dunner, L.L.P.

(57) ABSTRACT

A system for powering an electric device with power drawn from a telephone line in a telephone network includes an exchange connecting a telecommunication network to a subscriber apparatus through one telephone line. The system includes a control and feeding device located at the subscriber's premises, connected between the telephone line and subscriber apparatus, and further connected to the electric device to be powered, and a logic control unit in the exchange connected between the subscriber line interface circuit of the telephone line and the telecommunication network, and a bidirectional device connected between the logic control unit and subscriber circuit for recognising and applying to the logic control unit signals received by the subscriber circuit through the telephone line, and for sending to the subscriber circuit control information generated by said logic control unit and relating to the power drawing.

30 Claims, 3 Drawing Sheets

U.S. PATENT DOCUMENTS

| | | | |
|---|---|---|---|
| 5,608,792 A * | 3/1997 | Laidler | 379/386 |
| 5,937,061 A * | 8/1999 | Kim | 379/413 |
| 5,960,358 A * | 9/1999 | Fujikura et al. | 455/462 |
| 6,212,226 B1 * | 4/2001 | Newton | 375/222 |
| 6,256,518 B1 * | 7/2001 | Buhrmann | 455/572 |
| 6,847,718 B1 * | 1/2005 | Hiraoka | 379/413 |
| 7,095,848 B1 * | 8/2006 | Fischer et al. | 379/412 |
| 2002/0075038 A1 | 6/2002 | Mathew et al. | |
| 2003/0202655 A1 | 10/2003 | Nattkemper et al. | |

FOREIGN PATENT DOCUMENTS

| | | |
|---|---|---|
| DE | 100 41 521 A 1 | 3/2001 |
| EP | 0 367 270 A2 | 5/1990 |

\* cited by examiner

DEVICE AND A METHOD FOR FEEDING ELECTRIC DEVICES FROM A TELEPHONE LINE

CROSS REFERENCE TO RELATED APPLICATION

This application is a national phase application based on PCT/EP2004/003878, filed Apr. 13, 2004, the content of which is incorporated herein by reference.

FIELD OF INVENTION

The present invention relates to drawing power from a telephone line to supply electrical devices, such as low power electric or electronic devices. The invention is particularly useful for supplying electric devices during an emergency situation such as a power failure of the electric network.

BACKGROUND OF INVENTION

As it is known, in a telephone system a conventional subscriber line connecting the switching exchange (local Central Office) to the customer's equipment comprises a pair of (twisted) copper wires carrying both the telephone signals and a dc current to power the telephone electronics.

Most telephone companies in the world are bound to ensure continued telephone service to their customers for a given time duration in the event of a failure of the power distribution network (e.g. for 72 hours), and are equipped with backup generators so that under given circumstances a telephone line might be the only available source of (moderate) electrical power.

Drawing a fraction of such power for feeding the subscriber apparatus is usually allowed by the telephone companies and even the feeding of additional devices at the subscriber's premises is usually tolerated when the line is in use, i.e. in telephone jargon, when the line is in an off-hook condition.

On the other hand, the telephone companies prevent or limit the drawing of a dc power from a line in the off-hook condition for both avoiding a useless power consumption and an unauthorised feeding of other devices in the customer premises. Namely, after the subscriber has lifted the handset (or pushed a key) to be connected with the telephone exchange, a dial tone is sent to the customer apparatus and a predetermined delay is allowed for setting up the call. In case a proper selection number is not dialed and/or the call has not be set up within a given time, the line is "restrained" or set in a so called "park condition", in which the dc power supplied through the line is reduced to a very low level and a dialing is no longer allowed. Thus the user is compelled to hang up the handset, and return to an on-hook condition. The above procedure also applies in case of a misplaced handset.

The on-hook and off-hook conditions are recognised by the central office through the current circulating in the line. Under normal (on-hook) conditions the subscriber apparatus does not draw an appreciable current (e.g. lower than 1 mA) whereas in the off-hook condition an impedance depending on the particular handset, on the line length and on other factors is connected to the line and a given range of current (loop current) is admitted.

There have been suggested devices for drawing electrical power from a telephone line when the telephone line is in the off-hook condition.

For example, US 2002/0075038 A1 discloses a power supply circuit for powering an electrical device coupled to a telephone line, such as a modem using power drawn from said telephone line when this latter is in an off-hook condition.

U.S. Pat. No. 5,461,671 discloses a telephone line power utility circuit in which dc power supplied through a telephone line in an off-hook condition is utilised as a power source for a line terminal device.

U.S. Pat. No. 5,553,138 discloses a telecommunication unit requiring power even in an on-hook condition that employs a capacitor charged in the off-hook condition. When the capacitor charge becomes too low, the unit goes off-hook for a brief period of time to recharge the capacitor.

DE 10041521 discloses a power supply procedure for extracting power from a subscriber's line during a commercial power supply failure in which a failure detection signal is output during failure of the power network at the subscriber's premises and electric power is then supplied from the station to the subscriber's line to operate the telephone circuit.

The known devices have therefore a number of limitations and drawbacks, such as:

- The current drawing for feeding additional devices, when tolerated, is not under the control of the telephone company.
- The amount of power that can be delivered to a device is quite limited and requires the maintaining of a telephone call, i.e. an off-hook condition of the telephone line.
- There is no way to modify the power drawing limits even under circumstances that would render desirable such a power drawing.
- The current drawing interferes with the normal operation of the telephone service.

It is therefore an object of the present invention to overcome the drawbacks and limitations of the prior art devices and methods, and particularly to allow the drawing of not negligible amounts of electrical power from a telephone line for feeding electric devices.

It is another object of the invention to accomplish such current drawing in an on-hook condition of the telephone line and under the control of the telephone company running the utility.

It is a further object of the invention to realise a service available to authorised subscribers for controllably drawing a dc current from a telephone line in an on-hook condition.

SUMMARY OF INVENTION

The above objects of the present invention are achieved through a system, a method, a telephone exchange, a telephone network, a computer program product and a service as claimed in the hereby attached independent claims. Additional advantageous features are recited in the dependent claims.

The invention allows the use of the telephone line as source of electric energy to feed low power devices (modems, radio receivers for example) or to recharge batteries (e.g. those of a cellular phone). Indicatively, on the telephone line there is available a current of 20 mA at 5 V. For obtaining a larger power it is possible for instance to use more telephone lines.

The invention provides a service of power drawing that allows control by the telephone company. Namely, according to the invention, a power drawing can be allowed either to a single authorised subscriber requesting to avail of such service, or to one or more (authorised or not) subscriber(s) following the request of a different authorised subscriber, or to (authorised or not) subscriber(s) following an enabling request from a device in the telecommunication network, e.g. an automatic enabling request following an emergency situation or a general or local power failure. Also the amount of power drawn could be increased to appreciable levels by enabling two or more lines located in the same premises and connecting them together.

Advantageously, under emergency conditions civil defence and/or rescue personnel might need an electric power source from different locations to power or recharge cellular phones and communication devices and according to the invention such power could be easily and quickly be drawn from any telephone line to the authorised personnel.

BRIEF DESCRIPTION OF THE DRAWINGS

The invention will be now disclosed hereinbelow with reference to the attached drawings of preferred but non limiting embodiments thereof, in which.

Throughout all the Figures the same references have been used to indicate components that are equal or implement substantially equivalent functions.

DETAILED DESCRIPTION OF THE INVENTION

Figure 1:
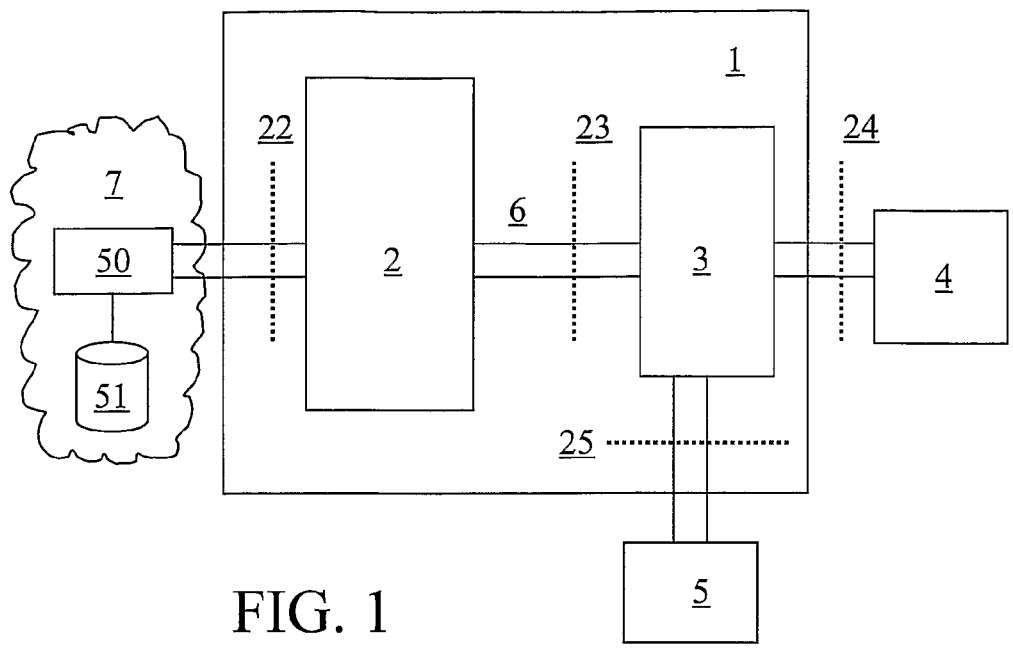
FIG. 1 is a block diagram illustrating the arrangement for drawing electrical power from a telephone line according to the invention.

With reference to FIG. 1, a telephone network 1 comprises a telephone exchange 2 connected through a connection 22 to a telecommunication network 7 and through telephone (e.g. copper) lines to a plurality of subscribers, with only one telephone line 6 (illustrated as a physical line in the figures) and one subscriber apparatus 4 being shown in the Figure. In accordance with the invention a device 50 is/can be provided in the telecommunication network 7 and connected to a database 51, as it will be illustrated with more details later on.

The expression "subscriber apparatus" is to be meant as indicating a generic line terminal equipment at the user's premises, such as a telephone set, a modem, a facsimile device, etc., which is connected or connectable to the telephone line 6 for using telecommunications services through the telephone line 6.

In a known manner, the telephone exchange 2 comprises an arrangement (known in the art and not shown in the Figure) for feeding a dc voltage to the subscriber apparatus 4 through the telephone line 6. According to the invention, at the subscriber's premises a control and feeding device 3 is connected between the telephone exchange 2 (connection 23) and the subscriber apparatus 4 (connection 24), whereas the telephone exchange 2 has been modified as will be illustrated in more details with reference to FIG. 2.

Through a connection 25, the control and feeding device 3 is connected or connectable to an additional device (or in general terms a "load") 5 to which electric power has to be delivered, such as an electric or electronic device or a battery to be recharged, which can be completely unrelated to the subscriber apparatus 4.

The switching exchange 2 can be a conventional exchange known in the art such as for example an AXE system from Ericsson, a UT100 system from Italtel, or other known systems.

The structure of the exchange will not be illustrated in detail but only its components that are relevant to the present description will be shown.

Figure 2:
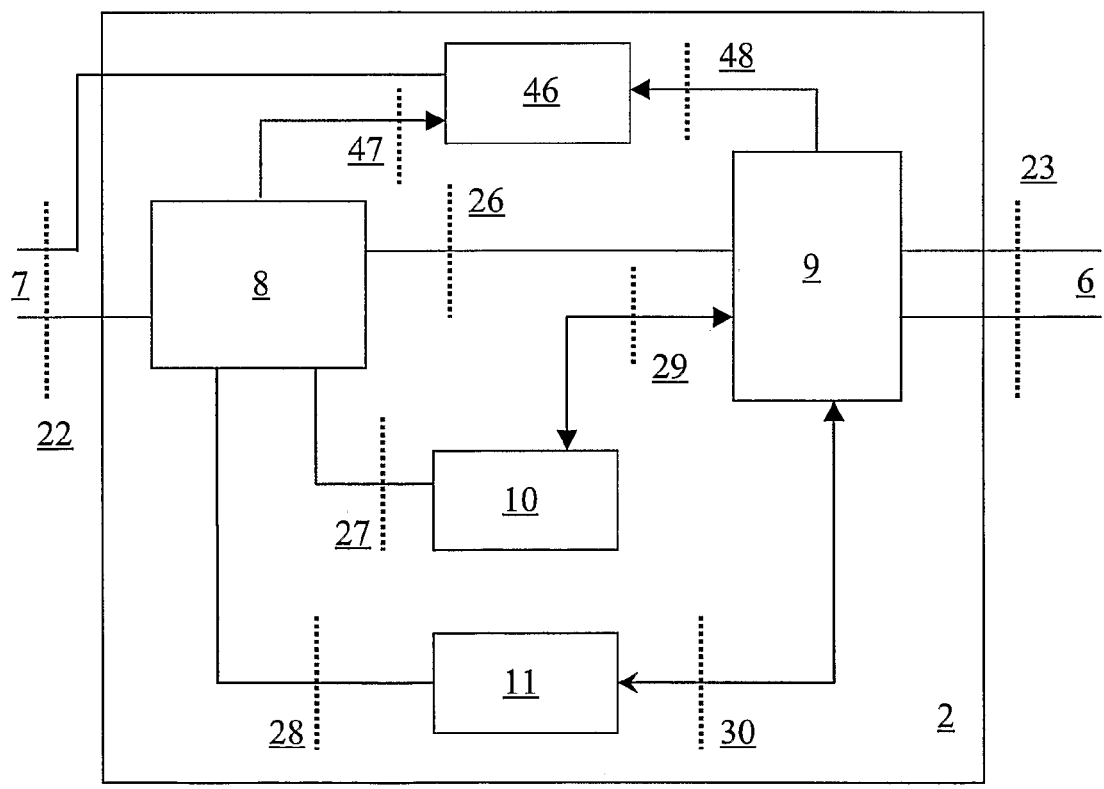
FIG. 2 illustrates some components of a telephone exchange incorporating the invention.

With reference to FIG. 2, the exchange 2 comprises in particular:

a plurality of subscriber line interface circuits 9, only one of which is shown in the Figure, adapted to handle the subscriber lines 6 and more particularly to recognise the subscriber, to feed the telephone line in the off-hook condition and to send signals such as a dial tone to, and receiving dialing signals from, the subscriber set;

a logic control unit 8 connecting the exchange 2 with the telecommunication network 7 for signalling purposes; more generally said logic control unit 8 is associated with the telephone exchange 2 and can also be located outside of the telephone exchange 2;

a bi-directional device 10,11 between the logic control unit 8 and the subscriber circuit 9, for recognising and applying to the logic control unit 8 signals received by the subscriber circuit 9 through the telephone line 6, and for sending to said subscriber circuit 9 control information generated by said logic control unit 8 and relating to the power drawing procedure;

a switching matrix 46 receiving a control signal from the logic control unit 8 through a connection 47 and a voice and data information signal from the subscriber circuit 9 through a connection 48, for transmitting said signal to the telecommunication network 7.

The subscriber line interface circuits 9 are made up by electronic circuits operating like interfaces between the subscriber lines and the control and feeding device 3, for managing the calls and supplying power to the subscribers lines 6. Each subscriber circuit 9 is provided with the connections 23, 26, 29, 30 and 48.

The logic control unit 8 includes application programs for handling the functionalities and the services of the exchange.

In accordance with the disclosed embodiment of the invention, the bi-directional device comprises a DTMF (Dual Tone Multi-Frequency) transceiver 10 and a modem 11, or other devices suitable for signalling purposes such as ISDN (Integrated Service Digital Network) devices.

In a preferred embodiment which makes use of a DTMF transceiver, the transceiver 10 is capable of decoding signals transmitted by the subscriber apparatus to the exchange 2 along the telephone line 6. The receiver can recognise the signals generated by the subscriber apparatus 4 and possibly by the control and feeding device 3 through the connection 29, and can forward them to the logic control unit 8 through the connection 27.

The modem 11 can be a modem operating in the audio band used for delivering band information from the logic control unit 8 (connection 28) to the control and feeding device 3 (connection 30) and the subscriber apparatus. Such information is used to control and manage the power drawing process.

Through the connection 22 the logic control unit 8 exchanges the telecommunication traffic (voice and data information) with the telecommunication network 7, whereas through the connection 26 the logic control unit 8 interacts with the subscriber circuit 9. In accordance with the present invention, the logic control unit 8 incorporates programs integrated with the existing programs to implement the functionalities required for managing the power supply service.

Figure 3:
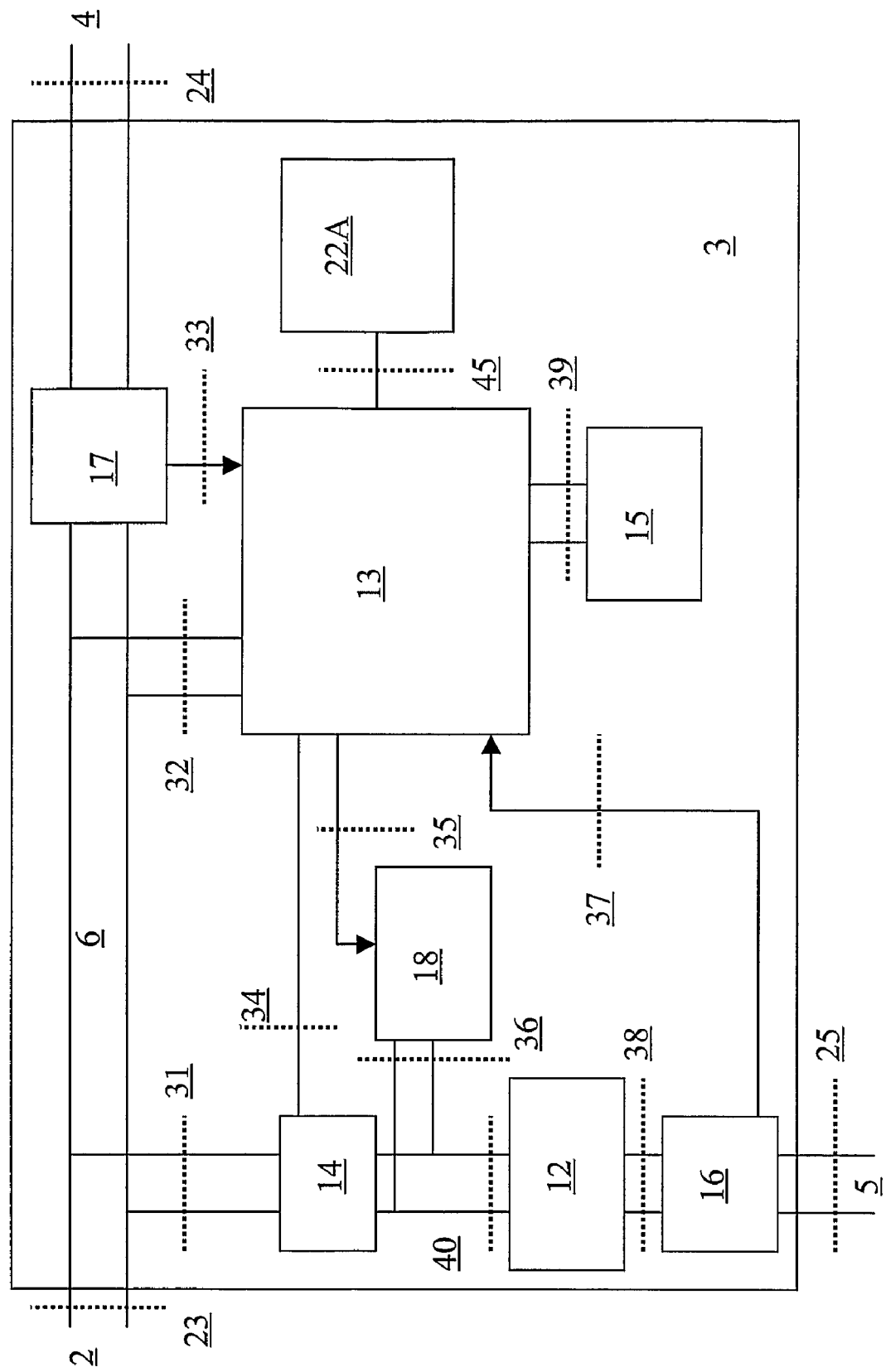
FIG. 3 illustrates an embodiment of a control and feeding device according to the invention.

FIG. 3 illustrates an embodiment of a control and feeding device 3 according to the invention. This device comprises a dc-dc converter 12 connected to the telephone line 6 through a switch 14. The dc-dc converter 12 is adapted to convert the dc voltage present on the telephone line into a dc voltage adapted to the additional device or load 5 to be fed by the telephone line. The connections between the telephone line 6 and the switch 14, and between the switch 14 and the dc-dc converter 12 are indicated by 31 and 40, respectively. The switch 14 is controlled by a logic unit 13 through a connection 34 and the logic unit 13 is in turn connected at 32 to the telephone line 6.

The additional electric device 5, schematically shown in FIG. 1 and also referred to as a load, is connected or connectable to the output of the dc-dc converter 12 through a sensing arrangement 16 and a connection 25. The sensing arrangement 16 is connected to the dc-dc converter 12 through a connection 38. The purpose of the sensing arrangement 16 is to detect the voltage applied to the load 5 and the current circulating through it and to supply this information to the logic unit 13. A further sensing arrangement 17 for detecting the voltage applied to and the current circulating in the telephone line is connected to the telephone line 6 downstream of the logic unit 13. Typically each sensor arrangement comprises a voltage sensor and a current sensor. The information of both sensor arrangements are delivered to the logic unit 13 through connections 33 and 37, respectively.

An auxiliary device or load 18 is connected to the switch 14 (connection 36) under control of the logic unit 13 (connection 35). The auxiliary load 18 is connected in parallel with the dc-dc converter 12 and can draw current from the telephone line when so enabled through the connection 35 and when the switch 14 is closed.

To the logic unit 13 there is additionally connected through a connection 45 an I/O device 22A for sending and receiving control and status signals. Preferably the I/O device 22A comprises an alphanumerical keyboard and a display.

The logic unit 13 locally controls the drawing (supply) of the dc power from the telephone line and is realised by conventional electronic devices, as better detailed in the following in an exemplary embodiment. The logic unit 13 receives information about the state of the line 6 (on-hook or off-hook as detected by the sensor arrangement 17) and about the power drawn (voltage and current) by the load 5 through the sensor arrangement 16 and connection 37.

The logic unit 13 is powered by a battery 15 through a connection 39 and is preferably rechargeable and connected so as to be recharged through the device of the invention (not shown).

Figure 4:
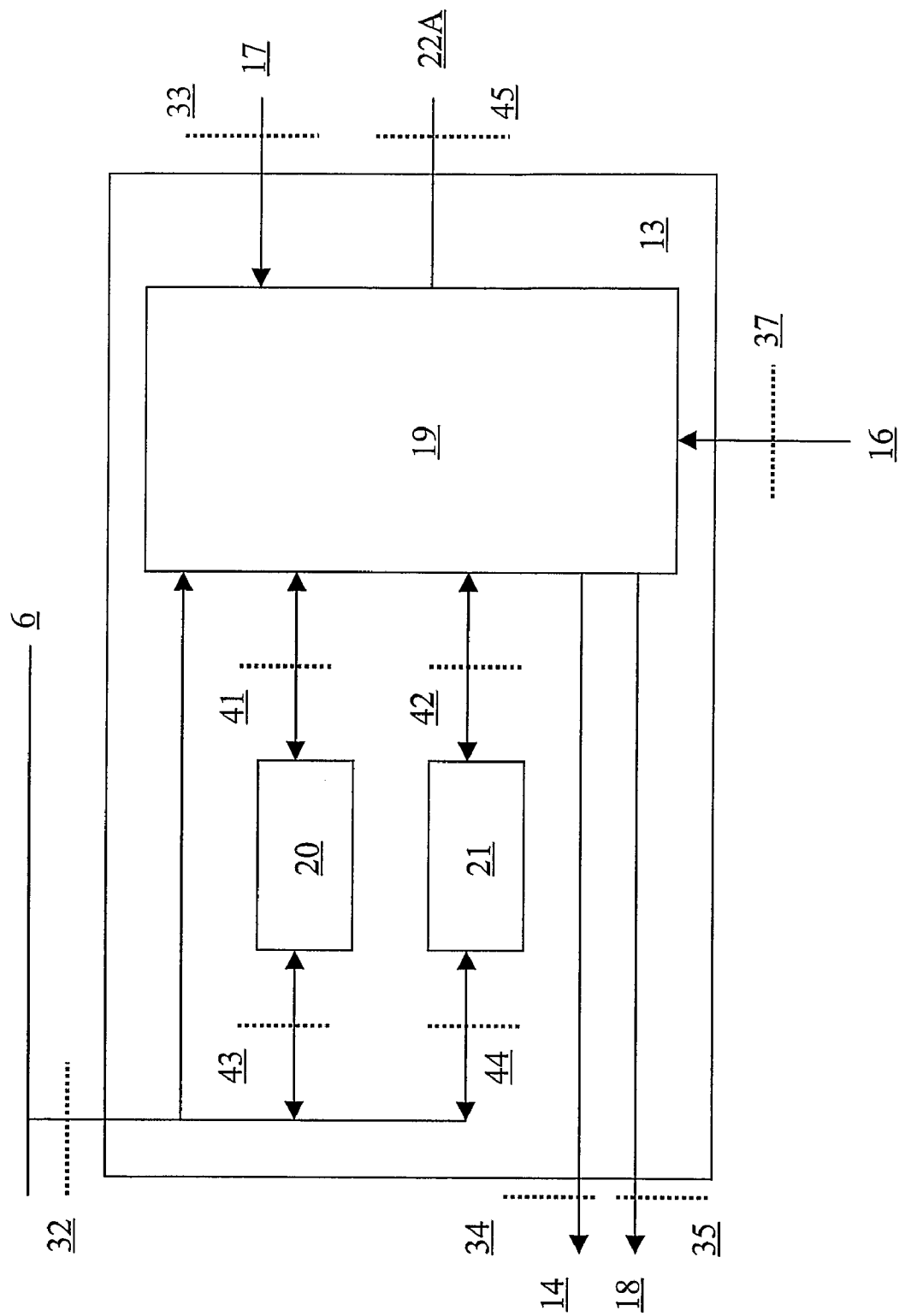
FIG. 4 illustrates with more details the logic unit of the control and feeding device.

FIG. 4 illustrated with more details the construction of the logic unit 13. The logic unit 13 comprises a logic (processing) unit 19 and a bi-directional device comprising, in the illustrated embodiment, a DTMF transmitter 20 and a modem 21 similar to the DTMF transmitter 10 and the modem 11 in the exchange 2.

The processing unit 19, that for example can be made up by electronic logic devices, processes the information on the line conditions received from the sensing arrangements 16 and 17 through the connections 33 and 37. The processing unit 19 is connected to the DTMF transmitter 20 through connection 41 and delivers to such unit command signals in accordance with logical rules embedded or programmed in unit 19. The DTMF transmitter 20 codifies such command signals which are sent to the exchange 2 through the connections 43 and 32 and telephone line 6. The processing unit 19 receives information from the exchange 2 either directly through the connection 32 or through the modem 21 (connections 44 and 42) or through the DTMF transmitter 20. The processing unit 19 is further connected to the switch 14 and the load 18 through connections 34 and 35, respectively, for delivering to such components control command signals to connect or disconnect such components.

The operation of the invention will be illustrated hereinbelow.

Starting from an on-hook condition, the user unhooks the telephone set and accomplishes a login (or registration) procedure to be identified or recognised by the exchange and enabled to avail of the service, i.e. to draw power from the telephone line. There are possible several types of recognition and enabling, each of them implying different procedures.

In case the power drawing is allowed only to one line or to a predetermined number of telephone lines upon signature of a contract by the subscriber concerning such line(s), a so called authorised subscriber, the recognition and enabling procedure simply requires the transmission of a request by the user, e.g. one or more dialed code numbers, and the exchange will automatically enable a power drawing condition from the telephone line(s).

In a more general situation, any line of a plurality of lines of a telephone network can be, enabled to supply dc power to an authorised entity, such as a registered user identified by a password, pin number or other unique identifier issued by the telephone company after the signature of a contract. Under these circumstances, the registered user will be identified when calling from one line of the plurality or even from any other line of the telecommunication network, and one or more lines will be enabled to supply dc power for feeding the device(s) connected thereto. Such a call can take place through the subscriber telephone apparatus or a dedicated apparatus, and the procedure will involve the transmission of the above identifying codes and of the telephone number(s) of the line(s) to be enabled.

In a further embodiment, the call could be replaced by a signalling procedure from the network device 50 in the telecommunication network 7.

To enable a line, the exchange 2 will properly set the logic control unit 8 to allow for the maintenance of the dc voltage on the telephone line and the delivering of an electric power although a call connection has not been established on the concerned telephone line(s).

The line enable procedure starts with the transmission of, for instance, a DTMF signal, issued from the subscriber apparatus 4 or from the control and feeding device 3 and delivered to the exchange 2. Upon receiving such DTMF signal, the exchange 2 disactivates the restraining process, stops the issue of the dial tone and sends a confirmation signal to the user. This confirmation signal is for example an audio tone or an audio signal transmitted by the modem 11 with a procedure similar to that used for sending back information to the subscriber (e.g. the CLI signal). A visual indicator on the control and feeding device 3, in particular in the I/O device 22A, can be actuated by such confirmation signal.

Upon receiving the confirmation signal, the control and feeding device 3 causes the closure of the switch 14 (for example through a predetermined procedure in its logic control unit 8), and therefore the connection of the dc-dc converter 12 to the line 6, thus starting the feeding of the load 5.

Although a dc voltage is present on the subscriber line 6, the subscriber apparatus is not considered as busy by the exchange 2, and therefore an incoming call for this subscriber will be regularly forwarded. On the other hand, an outgoing call from the subscriber drawing dc power will not be prevented.

As for what concerns the subscriber side, in case of an incoming call, the exchange 2 forwards the ringing current along the telephone line 6 connected to the subscriber at which a power supply is being delivered. The logic unit 13 of the control and feeding device 3 recognises this ringing current by means of the voltage and current signals from the sensor arrangement 17 and opens the switch 14 thus disconnecting the dc-dc converter 12 from the line 6 and stopping the power drawing condition. The ringing current operates the ringer of the subscriber apparatus 4 and in case the subscriber replies (i.e. lifts the handset or accomplishes an equivalent action), a normal telephone call is set up.

At the end of the conversation, the subscriber hangs on and this causes a raise of the line voltage from an operating level in the order of 7-9 V to a level in the order of 30-40 V. The control and feeding device 3 detects this change thanks to the signal coming from the sensor arrangement 17 and causes the closure of the switch 14, thus connecting again the telephone line 6 with the dc-dc converter 12 and resuming the power drawing condition. At the end of the call the exchange 2 restores the active condition previously suspended and returns to the conditions provided for the power drawing condition. One or more delays can be provided for delaying the intervention of the switch 14 in order to allow the exchange to restore a condition of "USE" before the line selector is activated for properly timing the two events.

In this way a telephone call can be set up and carried out without interference with the feeding process that has been temporarily stopped.

Again at the subscriber side, in case of an outgoing call, i.e. when the subscriber connected to the line 6 from which power is being drawn lifts the handset to initiate a call, the control and feeding device 3 detects the presence of a line current circulating in the telephone line due to the off-hook condition by means of the signal received from the sensor arrangement 17. As a consequence, the control and feeding device 3 opens the switch 14 thus disconnecting the dc-dc converter 12 from the line 6 and stopping the power drawing condition. Then the logic unit 13 sends a proper signal (e.g. a DTMF signal) to the logic control unit 8 of the exchange 2 that in response suspends the power drawing condition. The logic unit 13 then sends a dial tone signal along the telephone line so that the exchange can accept the dialed number. From this point onwards the telephone call proceeds in a conventional manner. The return to the power drawing condition, after the end of the telephone call, is accomplished as illustrated above.

Thus the normal telephone functions will not be affected by the power drawing.

The power delivering can be terminated either manually or automatically. In case of a manual termination, the subscriber communicates to the exchange his/her intention, for example sending one or more DTMF tones and the control and feeding device 3 is set to a suspended condition waiting for a subsequent activation.

When an automatic termination is provided, e.g. when an interruption of the current in the line is detected, the exchange 2 will stop the power delivering process without any intervention from the user.

To meet situations of temporarily removal of the device being fed, e.g. when replacing a substantially recharged battery with another battery to be recharged, an auxiliary load 18 is provided in an embodiment of a system according to the invention.

When the device 5 is removed, there is a drop in the current circulating in the line that would lead to a termination of the feeding condition. To prevent this, after detecting a change of the line current through the sensor arrangement 16, the logic unit 13 causes the connection of the auxiliary load 18 to the switch 14 for a given time duration, typically through a delay device such as a timer. The current drawn by the load 18 is such as to maintain a current in line 6 similar to the one drawn when feeding the device 5, whereby the termination procedure is not started. However, after the predetermined delay has lapsed, the auxiliary load is removed and in case no other device 5 has been connected, the termination procedure takes place.

An additional feature of the invention can be that of preventing the use of the telephone line for calls when a supply process is being carried out, or that of using two or more telephone lines at the premises of a single subscriber to increase the power drawn.

In accordance with an embodiment of the invention and by making again reference to FIG. 1, the telecommunication network 7 comprises a network device 50 which contains or is connected to a database 51.

The database 51 contains a user unique identifier for each user having subscribed to the service managed by the telephone company for feeding an electric device—different from the subscriber apparatus—through a telephone line.

Preferably, a program is installed in the logic control unit 8 for accomplishing the steps of:
 managing the signalling procedure with the device at the user side for enabling the power drawing service;
 verifying whether the user is authorised to access to the service by comparing the user unique identifier, e.g. a password or a PIN number, with the data stored in the database 51, and in positive case
 activating the power drawing service at the user side, and
 disactivating the power drawing service when a manual or automatic termination of the service occurs at the user side.

The invention can be used also with ISDN lines. In this case, the signalling procedures could be different from those described above and be based on the typical ISDN signalling procedures. However, the whole logic and the method of the invention above described remain the same.

The invention allows the use of the telephone line as a source of electric energy to feed low power electronic devices, e.g. modems and radio receivers, or to recharge batteries, e.g. those of a cellular phone. Inductively, the power available on the telephone line is in the order of 20 mA at 5V. A larger power can be drawn for example by modifying the subscriber's apparatus connections to the switching exchange or by using twisted copper wires having larger sections.

The invention can be particularly useful for emergency situations which do not affect directly the user having subscribed to a service for taking power from a telephone line. In fact, such a service can also be remotely activated by a subscriber to the service in order to allow a different user, who is actually in an emergency situation, such as for example in a black-out situation, to draw power from a telephone line available to him although the line subscriber is not a subscriber to the service.

Although the present invention has been illustrated with reference to actually preferred embodiments, it is generally subjected to other applications and modifications which fall within the scope of the invention, as it will be evident to the skilled of the art.

The invention claimed is:

1. A system for powering an electric device with power drawn from a subscriber telephone line in a telephone network comprising an exchange connecting a telecommunication network to a subscriber apparatus through said telephone line comprising:
 a logic control unit associated with said exchange and connected between a subscriber line interface circuit of the telephone line and said telecommunication network, the logic control unit being configured to verify a subscriber authorized to draw electrical power from the telephone line and to generate control information for enabling power drawing by the electric device; and a bi-directional device connected between said logic control unit and the subscriber line interface circuit for recognising and applying to the logic control unit signals received by the subscriber line interface circuit through the telephone line and for sending to a control and feeding device at the subscriber's premises through said subscriber line interface circuit the control information generated by said logic control unit for enabling power drawing by said electric device.

2. The system as claimed in claim 1, wherein said bi-directional device comprises a DTMF transceiver and a modem.

3. The system as claimed in claim 2, wherein said DTMF transceiver is capable of decoding signals transmitted by the subscriber apparatus to the exchange along said telephone line of recognising signals generated by said subscriber apparatus and control and feeding device and of forwarding them to the logic control unit.

4. The system as claimed in claim 2, wherein said modem is an audio band modem adapted to deliver band information from said logic control unit to said control and feeding device and the subscriber apparatus, said band information being used to control the power drawing process.

5. The system as claimed in claim 1, further comprising said control and feeding device, wherein said control and feeding device comprises a dc-dc converter connected to the telephone line and connectable to said electric device through a switch under the control of a logic unit connected to said telephone line.

6. The system as claimed in claim 5, wherein said control and feeding device comprises a first sensing arrangement for detecting the voltage applied to said electric device and the current circulating through said electric device.

7. The system as claimed in claim 6, wherein said logic unit comprises a second sensing arrangement connected to the telephone line downstream of said logic unit for detecting the voltage applied to and the current circulating through the telephone line.

8. The system as claimed in claim 7, wherein said logic unit comprises a logic processing unit connected to said second sensing arrangement and a further bi-directional device connected between the logic processing unit and the telephone line, said logic processing unit being further directly connected to said telephone line.

9. The system as claimed in claim 6, wherein said logic unit comprises a logic processing unit connected to said first sensing arrangement and a further bi-directional device connected between the logic processing unit and the telephone line, said logic processing unit being further directly connected to said telephone line.

10. The system as claimed in claim 9, wherein said further bi-directional device comprises a DTMF transmitter and a modem, said processing unit being connected to said DTMF transmitter to deliver to such unit command signals in accordance with predetermined logical rules, and to said modem for receiving coded command signals from said exchange.

11. The system as claimed in claim 10, wherein said processing unit is connected to said switch and said additional load for delivering control command signals to connect or disconnect such components.

12. The system as claimed in claim 5, wherein said control and feeding device comprises an auxiliary load connectable to said switch for drawing current from the telephone line under control of said logic unit.

13. The system as claimed in claim 5, wherein said control and feeding device further comprises an I/O device for sending and receiving control and status signals.

14. The system as claimed in claim 13, wherein said I/O device comprises an alphanumerical keyboard and a display.

15. The system as claimed in claim 5, wherein said control and feeding device is powered by a dedicated battery.

16. The system as claimed in claim 15, wherein said dedicated battery is rechargeable and connected to be recharged through said telephone line.

17. A method for feeding electric devices through at least one telephone line in a telephone network comprising an exchange connected to a plurality of subscriber apparatuses through subscriber telephone lines, comprising:

a) receiving at said exchange a request for drawing electrical power from said at least one telephone line by a subscriber;

b) verifying, at a logic control unit associated with said exchange and connected between a subscriber line interface circuit of the at least one telephone line and a telecommunication network, that the subscriber is authorised to draw electrical power from said at least one telephone line from which said drawing of electrical power is requested to be enabled;

c) generating, at the logic control unit, enabling information for enabling power drawing by the electric device, and d) sending, to a control and feeding device at the subscriber's premises, the enabling information to supply electrical power for feeding said electric device through said at least one telephone line.

18. The method as claimed in claim 17, further comprising, between c) and d) overriding any restriction normally provided to disconnect said at least one telephone line from the exchange when the line is in an off-hook condition and no call is set up, while allowing the usual operations of receiving calls from and sending calls to said subscriber apparatus, said restrictions comprising a "park" condition.

19. The method as claimed in claim 18, wherein, upon receiving said request signal, the "park" condition is deactivated and the issue of the dial tone to the subscriber apparatus is prevented.

20. The method as claimed in claim 18, further comprising sending a confirmation signal, an audio tone or an audio signal from the exchange to the subscriber apparatus.

21. The method as claimed in claim 20, wherein said confirmation signal actuates a visual indicator at the subscriber's premises.

22. The method as claimed in claim 17, further comprising providing an adaptation of the voltage on the telephone line to the characteristics of the electric device to be fed.

23. The method as claimed in claim 17, wherein said request for drawing electrical power comprises a DTMF signal.

24. A method for providing a service to at least one subscriber in a telephone network comprising an exchange connected to a plurality of subscriber apparatuses through subscriber telephone lines, said service comprising the delivering of a dc power supply from at least one of said telephone lines to one or more electric devices comprising:

a) sending, from a subscriber apparatus, to said exchange a request for drawing electrical power from said at least one telephone line;

b) identifying, to a logic control unit associated with said exchange and connected between a subscriber line interface circuit of the at least one telephone line and a telecommunication network, information authorizing the subscriber to draw electrical power from said at least one telephone line from which said drawing of electrical power is to be enabled; and c) receiving, from the logic control unit of said exchange, enabling information to supply electrical power for feeding said electric device from said at least one telephone line.

25. The method for providing a service as claimed in claim 24, wherein the sending to said exchange a request for drawing electrical power is accomplished by the subscriber to whom the service has to be supplied.

26. The method for providing a service as claimed in claim 24, wherein the sending to said exchange a request for drawing electrical power is accomplished by an authorised subscriber different from at least one subscriber to whom the service has to be supplied.

27. The method for providing a service as claimed in claim 24, wherein the sending to said exchange a request for drawing electrical power is accomplished by a network device in a telecommunication network connected to said telephone exchange.

28. In a telephone network comprising an exchange connected to a plurality of subscriber apparatuses through switched subscriber telephone lines, a computer program embodied on a computer readable medium for feeding electric devices through at least one of said telephone lines, said program when executed performing steps at the exchange comprising:

managing a signalling procedure with a device at a user side for enabling a power drawing service;

verifying, at a logic control unit associated with said exchange and connected between a subscriber line interface circuit of the at least one telephone line and a telecommunication network, whether the user is authorised to access the service by comparing a user unique identifier with data stored in a database, and in a positive case activating the power drawing service at the user side by sending, to a control and feeding device at the user's premises, enabling information to supply electrical power through said at least one telephone line; and de-activating the power drawing service when a manual or automatic termination of the service occurs at the user side.

29. The computer program as claimed in claim 28, wherein said program is stored in a logic control unit associated with said exchange and connected between the subscriber line interface circuit of said telephone line and a telecommunication network to which said exchange is connected.

30. A telephone network comprising an exchange connected to a plurality of subscriber apparatuses through switched subscriber telephone lines for powering an electric device with power drawn from at least one of said telephone lines, the exchange connecting a telecommunication network to at least one of said subscriber apparatuses through said at least one telephone line, comprising:

a logic control unit associated with said exchange connected between a subscriber line interface circuit of the at least one telephone line and said telecommunication network, the logic control unit being configured to verify a subscriber authorized to draw electrical power from the telephone line and to generate control information for enabling power drawing by the electric device; and a bi-directional device connected between said logic control unit and the subscriber line interface circuit for recognising and applying to the logic control unit signals received by the subscriber line interface circuit through the at least one telephone line, and for sending to a control and feeding device at the subscriber's premises through said subscriber line interface circuit, the control information generated by said logic control unit for enabling power drawing to said electric device.

\* \* \* \* \*